United States Patent
Ross, Jr. et al.

(10) Patent No.: US 9,151,657 B2
(45) Date of Patent: Oct. 6, 2015

(54) DUAL MEASUREMENT LIQUID LEVEL TRANSDUCER

(71) Applicant: Texas LFP, LLC, Dallas, TX (US)

(72) Inventors: Herbert G. Ross, Jr., Argyle, TX (US); Gagik Farmanyan, Plano, TX (US); Carl Alan Taylor, Frisco, TX (US)

(73) Assignee: Texas LFP, LLC, Dallas, TX (US)

( * ) Notice: Subject to any disclaimer, the term of this patent is extended or adjusted under 35 U.S.C. 154(b) by 0 days.

(21) Appl. No.: 14/482,573

(22) Filed: Sep. 10, 2014

(65) Prior Publication Data

US 2015/0068301 A1 Mar. 12, 2015

Related U.S. Application Data (60) Provisional application No. 61/876,078, filed on Sep. 10, 2013.

(51) Int. Cl.
| | |
|---|---|
| *G01F 23/72* | (2006.01) |
| *G01F 23/28* | (2006.01) |
| *G01F 23/66* | (2006.01) |
| *G01F 23/68* | (2006.01) |
| *G01F 23/74* | (2006.01) |
| *G01F 23/76* | (2006.01) |
| *G01F 23/04* | (2006.01) |

(52) U.S. Cl.
CPC ................ *G01F 23/72* (2013.01); *G01F 23/04* (2013.01); *G01F 23/28* (2013.01); *G01F 23/66* (2013.01); *G01F 23/68* (2013.01); *G01F 23/683* (2013.01); *G01F 23/74* (2013.01); *G01F 23/76* (2013.01)

(58) Field of Classification Search
CPC ......... G01F 23/72; G01F 23/66; G01F 23/68; G01F 23/683
See application file for complete search history.

(56) References Cited

U.S. PATENT DOCUMENTS

| | | | |
|---|---|---|---|
| 2,868,016 A | 1/1959 | Steed | |
| 3,815,416 A | 6/1974 | Portis | |
| 4,126,040 A | 11/1978 | Varacins et al. | |
| 4,804,944 A | 2/1989 | Golladay et al. | |
| 4,924,703 A | 5/1990 | White et al. | |
| 5,076,101 A | 12/1991 | Lazure | |
| 5,900,546 A | 5/1999 | Wilkins | |
| 6,078,850 A | 6/2000 | Kane et al. | |
| 6,289,728 B1 | 9/2001 | Wilkins | |
| 7,610,806 B2 | 11/2009 | Skinner | |
| 7,819,003 B2 | 10/2010 | Breed et al. | |
| 7,978,067 B2 | 7/2011 | Wagner et al. | |
| 2013/0064716 A1* | 3/2013 | Fukuoka et al. | ............... 422/106 |

FOREIGN PATENT DOCUMENTS

| | | |
|---|---|---|
| CN | 202321325 U | 7/2012 |
| EP | 1 248 086 B1 | 10/2012 |

* cited by examiner

*Primary Examiner* — Paul West
(74) *Attorney, Agent, or Firm* — Alvin R. Wirthlin (57) ABSTRACT

A liquid level transducer for a tank, such as a railroad tank car or the like, includes a mounting head connected to the tank and a sensor assembly extending into the tank from the mounting head. The sensor assembly includes a sensor tube located in the tank and a gauging rod assembly positioned in the sensor tube. The gauging rod assembly can be pulled out of the tank until it magnetically couples with a magnetic float that surrounds the sensor tube. The float moves in response to a change in liquid level and the magnetic coupling provides the user with a visual indication of the liquid level. A sensor board extends along a length of the gauging rod assembly and is responsive to movement of the float for electronically determining the liquid level without the need to magnetically couple the gauging rod assembly to the float.

20 Claims, 7 Drawing Sheets

DUAL MEASUREMENT LIQUID LEVEL TRANSDUCER

CROSS-REFERENCE TO RELATED APPLICATIONS

This application claims the benefit of U.S. Provisional Application No. 61/876,078 filed on Sep. 10, 2014, the disclosure of which is hereby incorporated by reference.

BACKGROUND OF THE INVENTION

This invention relates to liquid level transducers, and more particularly to a liquid level transducer having a magnetic float that moves in response to a change in liquid level.

U.S. Pat. No. 3,815,416 to Dean et al. discloses a prior art apparatus for indicating the level of liquid in a tank car. The apparatus includes a float encircling a guide tube extending down into the tank. The float is magnetically coupled to a gauging rod which bears indicia representing the level of liquid in the tank. The gauging rod is normally retained inside the guide tube via an upper cover removably secured to the tank opening. When it is desirous to check the liquid level within the tank, the cover is removed and the gauging rod is manually raised until it is magnetically coupled with the float. Depending on the liquid level, the length of the gauging rod extending out of the tank will change. The user can ascertain the level in the tank by the visible indicia of the rod. The apparatus also has a mechanism for automatically visually and audibly alerting the user when the level has reached a particular level, such as a near full condition when the tank is being filled. This mechanism includes a tower and a series of reed switches mounted on the tank above the rod opening. A magnet attached to the top of the rod moves past the reed switches to serially actuate them as the tank is filled.

Although such systems are adequate for their intended purpose, they are quite unwieldy, relatively expensive, and require the user to gain access to the top of the tank before a measurement can be taken, which can be both time consuming and dangerous. Moreover, with these types of systems, it is not possible to determine the level of liquid in the tank from a remote location and/or when the tank is in transit.

Moreover, prior art guide tubes are typically filled with antifreeze or the like which surrounds the gauging rod to provide some resistance against movement when the gauging rod is decoupled from the float, such as when the tank is traveling and subjected to rail or road conditions that otherwise may cause the gauging rod to bounce within the guide tube. Unfortunately, the coolant can leak into the area that holds the magnet, thereby destroying the magnet and causing expensive replacement in terms of both components and time, and possibly resulting in less accurate readings, or no reading at all depending on the level of damage to the magnet.

In addition, due to the relatively weak magnetic coupling forces between the float and gauging rod of the prior art, the capacity to obtain consistent readings is diminished, hysteresis is relatively high, and more especially when coolant or other fluids enter the magnetic coupler of the gauging rod thereby changing its weight and the coupling height with the float.

Also, prior art gauging rods are prone to frictional wear and eventual failure as they slide up and down inside the guide tube in response to changes in liquid level and/or a user pulling the gauging rod upwardly to couple with the float or remove the gauging rod from the tank, and pushing the gauging rod downwardly to its seated position. Since a relatively large gap exists between the prior art magnetic coupler and the guide tube, the gauging rod may not couple efficiently with the float since it may be oriented at an angle other than coaxial with the guide tube. Accordingly, both the accuracy and the coupling forces may be compromised.

It would therefore be desirable to overcome one or more disadvantages associated with prior art liquid level transducers.

SUMMARY OF THE INVENTION

In accordance with one aspect of the invention, a transducer for determining the level of liquid within a container and includes a mounting head adapted for connection to the container and a sensor assembly adapted to extend into the container from the mounting head. The sensor has a sensor tube extending downwardly from the mounting head, a gauging rod assembly having an elongate rod positioned in the sensor tube for selective movement out of the tank for visually determining the liquid level, a first magnet connected to the gauging rod assembly, a float surrounding the sensor tube for sliding therealong in response to a change in liquid level, a second magnet connected to the float for selective coupling to the first magnet so that the gauging rod assembly and the float are selectively coupled together and a first sensor board extending along a length of the gauging rod assembly and being responsive to movement of the float for electronically determining the liquid level without the need to magnetically couple the gauging rod assembly to the float.

In accordance with another aspect of the invention, a liquid level gauge for determining the level of liquid within a container includes a mounting head adapted for connection to the container, a guide tube extending downwardly from the mounting head, and a gauging rod assembly having an elongate rod with level markings thereon. The elongate rod is normally positioned in the guide tube for selective movement out of the tank for visually determining the liquid level. A first magnet is connected to the gauging rod assembly. A float surrounds the guide tube for sliding therealong in response to a change in liquid level and includes a second magnet for selective coupling to the first magnet so that the gauging rod assembly and the float are selectively coupled together at a height of the liquid level. The magnetic coupling section includes a housing having a hollow interior for receiving the first magnet, a housing cover for enclosing the first magnet, and a first bushing located on one side of the housing. The bushing is sized to fit within the guide tube to thereby guide the gauging rod assembly linearly along a length of the guide tube.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
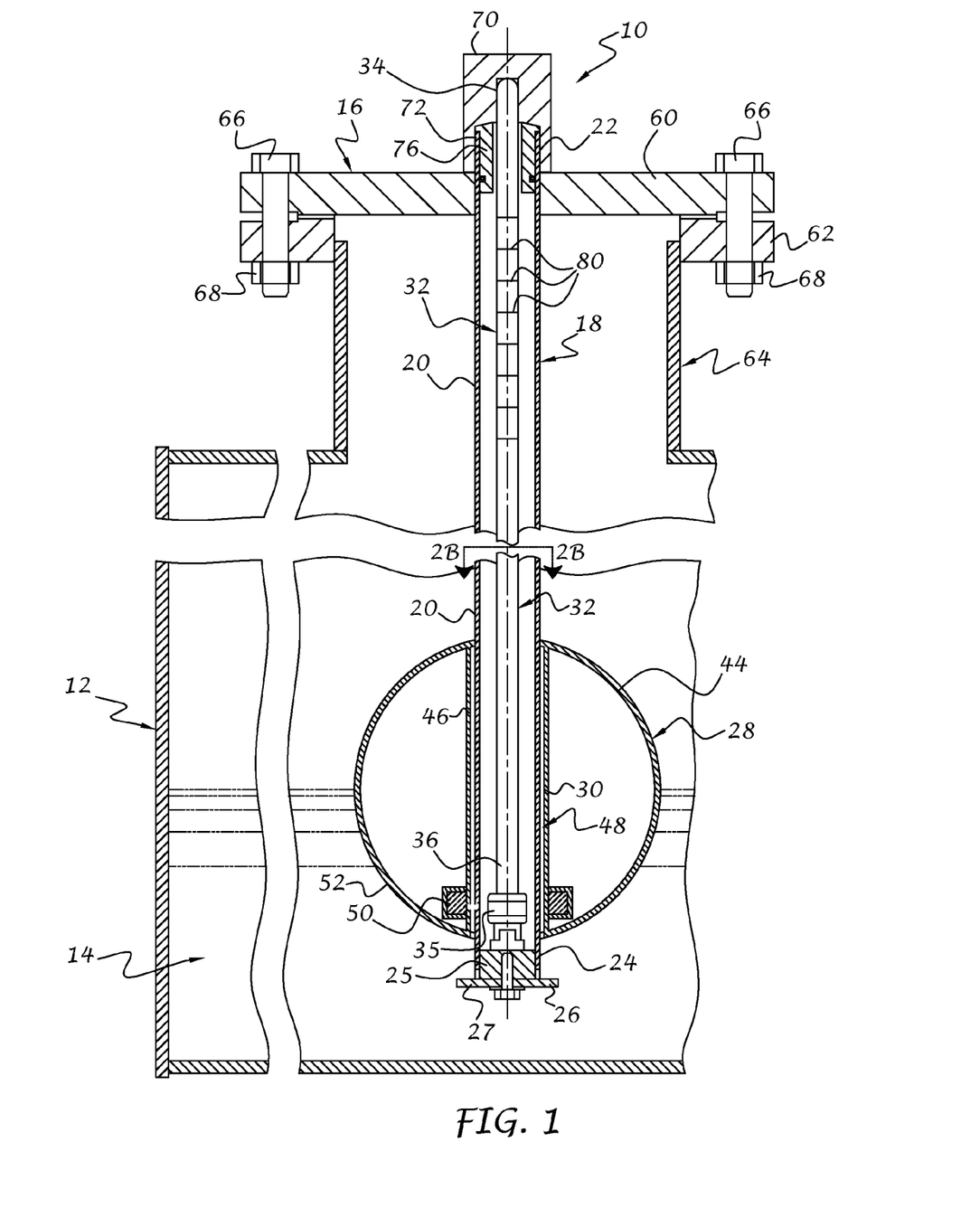
FIG. 1 is a sectional side view of a tank care and a partial sectional side view of a liquid level transducer assembly mounted in the tank car in accordance with one embodiment of the present invention.
Figures 1A, 1B:
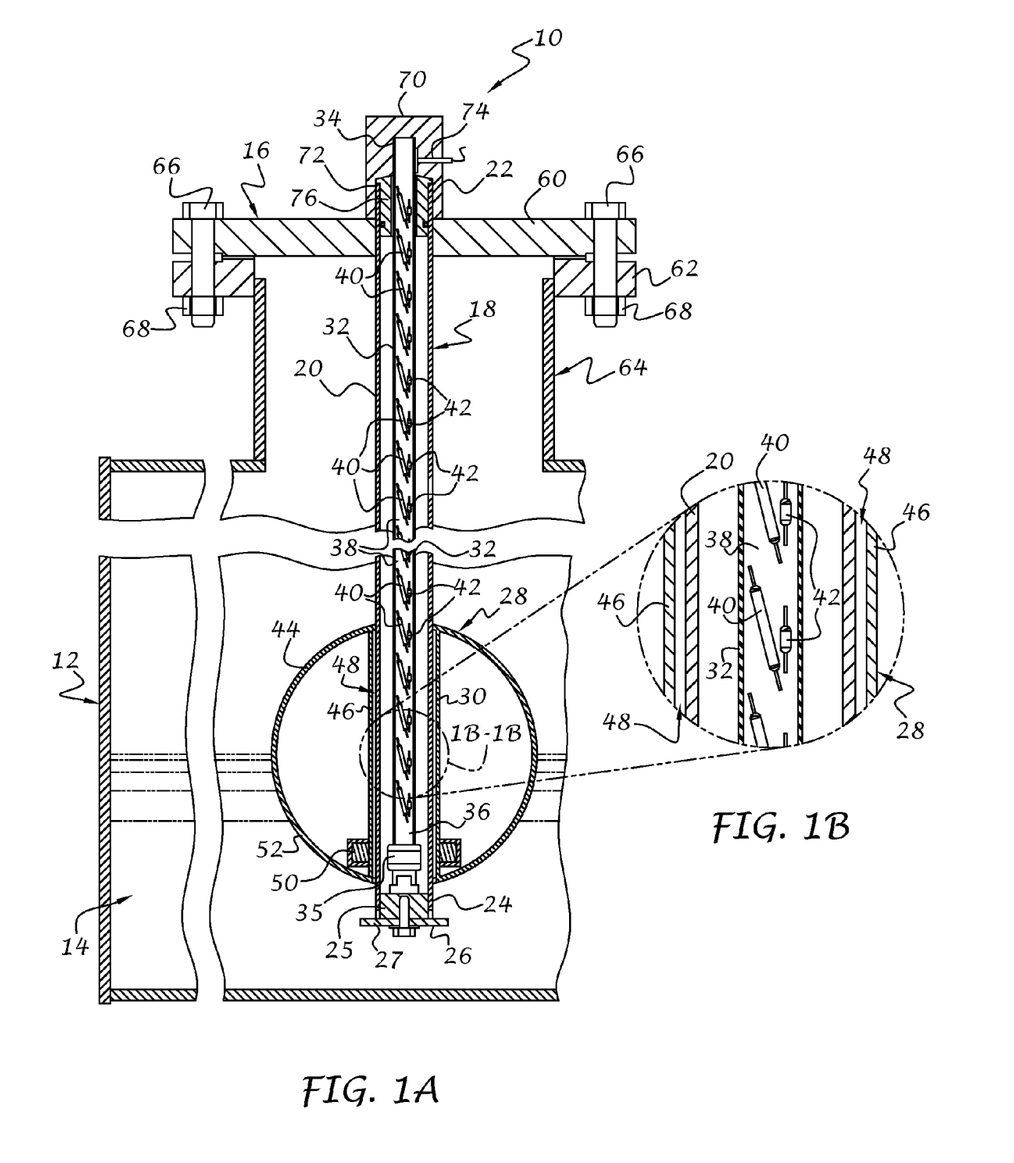
FIG. 1A is a view similar to FIG. 1 with the liquid level transducer assembly shown in longitudinal sectional view to expose the transducer components in accordance with an exemplary embodiment of the invention.
FIG. 1B is an enlarged view of a portion of the transducer assembly within the circle 1B of FIG. 1A.

Referring now to the drawings, and to FIGS. 1, 1A and 1B in particular, a liquid level transducer assembly 10 in accordance with an exemplary embodiment of the present invention is illustrated. The liquid level transducer assembly 10 preferably extends into a tank 12, which may be associated with railroad tanker cars, semi-trailer tankers, large stationary storage tanks, or any other container for holding and/or transporting a liquid 14 where it is desirous to determine the level of liquid within the tank and/or to determine when the tank has been adequately filled and/or emptied.

The transducer assembly 10 preferably includes a mounting head assembly 16 and an elongate sensing probe assembly 18 extending into the mounting head assembly 16 and oriented for extending downwardly into the tank.

The sensing probe assembly 18 preferably senses liquid level in a linear direction and, in accordance with one preferred embodiment of the invention, includes an outer sensor guide tube 20 with an upper end 22 that extends into the mounting head assembly 16 and a lower end 24 that terminates at a support member 26. A magnetic float 28 is preferably spherically-shaped and includes a central bore 30 that is sized to receive the sensor guide tube 20 so that the float slides freely therealong in response to changes in liquid level within the tank 12. An inner gauging rod 32 is located within the outer sensor guide tube 20 an has an upper end 34 that also extends through the mounting head assembly 16 and a lower end 36 fitted with a magnet 35. The support member 26 serves to both seal the guide tube 20 from the contents of the tank 12 and provide a lower stop for the gauging rod 32 to rest on when the gauging rod 32 is in the rest position, or the magnetically uncoupled condition with respect to the magnetic float 28. The sensor tube 20 is preferably constructed of non-magnetic materials such as plastic, aluminum, composites such as carbon fiber, fiberglass, and so on, as well as other materials or combinations thereof.

The support member 26 preferably includes a shank portion 25 that extends upwardly from a head portion 27 for sealing the lower end 24 of the outer sensor tube 20 against the ingress of the liquid 14 to be measured.

An elongate first sensor board 38, preferably in the form of a printed circuit board (PCB), is located on the gauging rod 32 in the sensor guide tube 20 and preferably extends along a substantial length thereof. A plurality of normally-open reed switches 40 are preferably located along the length of the sensor board 38 in series with a plurality of resistors 42. The reed switches are preferably oriented at an acute angle with respect to a longitudinal axis of the gauging rod 32 and are responsive to the magnetic float 28, for creating a liquid level signal, in conjunction with the resistors 42, as the float 28 rides along the outer sensor guide tube 20 in response to a change in liquid level within the tank. It will be understood that normally closed reed switches can alternatively be used without departing from the spirit and scope of the invention. Although not shown, the sensor board 38 can be connected to the gauging rod 32 through adhesive bonding, heat-shrink tubing wrapped around the sensor board 38 and rod 32, or any other suitable fastening means.

Although a particular number of reed switches are shown, it will be understood that more or less reed switches can be provided without departing from the spirit and scope of the invention. It will be further understood that other sensor(s) can be used without departing from the spirit and scope of the invention, including, but not limited to, hall-effect devices spaced at longer intervals along the gauging rod 32, optical sensors, mechanical switches, other electrical or mechanical position sensors, combinations thereof, and so on. It will be further understood that, when a plurality of sensors are used, equal spacing as shown in the drawings is not required.

In many instances where it may be more desirable to know how fast the tank is approaching a full level during a filling operation to cut off the pump (or the like) operating the liquid transfer into the tank, more sensors can be positioned closer together at the top of the sensor board 38 so that the liquid level can be more precisely and quickly determined at the top of the tank. To that end, it may be desirable, and in accordance with one aspect of the invention, to reduce or eliminate the sensors along at least half of the sensor board 38, or depth of the tank. Likewise, in the event where it may be more important to determine how fast the tank is approaching empty, it will be understood that more sensors can be located at the lower end of the sensor board 38, and thus the lower end of the tank.

It will be further understood that a single hall-effect sensor or the like can be placed at a single location or at a plurality of locations along the sensor board 38 and/or gauging rod. For instance the single sensor can be placed at or near the top of the sensor board 38 for detecting when the tank is approaching a full condition. In addition or alternatively, a sensor can be placed on the sensor board 38 at approximately a middle portion thereof for determining when the liquid in the tank reaches the half-way point. Likewise, a sensor can be positioned on the sensor board 38 and/or gauging rod at or near the bottom of the tank for determining when the tank is approaching an empty condition and/or when a filling operation has commenced.

The float 28 preferably includes a spherical body 44 with an inner wall 46 that forms the central bore 30 for surrounding the outer sensor guide tube 20, as previously described. The float 28 is preferably constructed of a rigid material, such as stainless steel or other metals, but may alternatively be constructed of other materials, such as closed-cell nitrile material, rubber, plastics, and so on, without departing from the spirit and Scope of the invention. It will be understood that the shapes of the float, sensor tube 20, the mounting head assembly, and so on, are given by way of example only, as other suitable shapes, such as square, triangular, and so on, can be used without departing from the spirit and scope of the invention.

As best shown in FIGS. 1A and 1B, the diameter of the inner annular wall 46 of the float 28 is larger than the outer diameter of the outer sensor guide tube 20 so that a gap 48 is formed therebetween. The gap 48 ensures that the float 28 will not become bound on the sensor guide tube 20 in the event that the tube and/or float may become coated with contaminants which may occur after extended immersion in certain fuels or other liquids within the tank 12. An annular or ring magnet 50 is located within the float 28 between the inner wall 46 and outer wall 52 thereof. The magnet 50 serves the dual purpose of: 1) magnetically coupling with the magnet 35 attached to the gauging rod 32; and 2) changing the electrical state of the reed switches 40 (or other sensor(s)) as the float 28 slides up and down the sensor tube 20 in response to a change in liquid level within the tank 12. Although many known materials can be used for the magnet 50, a preferred material is ceramic or ferrite made of a sintered composite of powdered iron oxide and barium/strontium carbonate ceramic or other suitable materials. It will be understood that the magnetic material is given by example only and can greatly vary without departing from the spirit and scope of the invention.

The magnet 35 is preferably magnetized on its outer and inner faces such that magnetic flux lines of force are directed perpendicular with respect to the longitudinal extent of the magnet and toward the center of the central bore 30 of the float 28. However, it will be understood that the polarity of the magnets can be reversed and/or the direction of magnetic flux can be oriented differently without departing from the spirit and scope of the invention.

The mounting head assembly 16 preferably includes a cover 60 that is removably fastened to a flange 62 of a manway section 64 of the tank 12 via a plurality of bolts 66 and associated nuts 68 as shown, or through other connection means. An end cap 70 is positioned over the cover 60 and is removably connected to the outer sensor tube 20. The end cap 70 has a central opening 72 that is of sufficient diameter to receive the upper end 22 of the sensor tube 20. A second sensor board 74 is associated with the end cap for receiving liquid level signals from the first sensor board 38 and relaying the signals via a hardwire connection to a display, alarm or the like, or via wireless connection in accordance with one aspect of the invention, as will be described with respect to FIG. 3. An upper plug or seal 76 is positioned in the upper end 22 of the sensor tube 20 and surrounds the gauging rod 32 to thereby create a seal.

Figures 2, 2A, 2B, 2C:
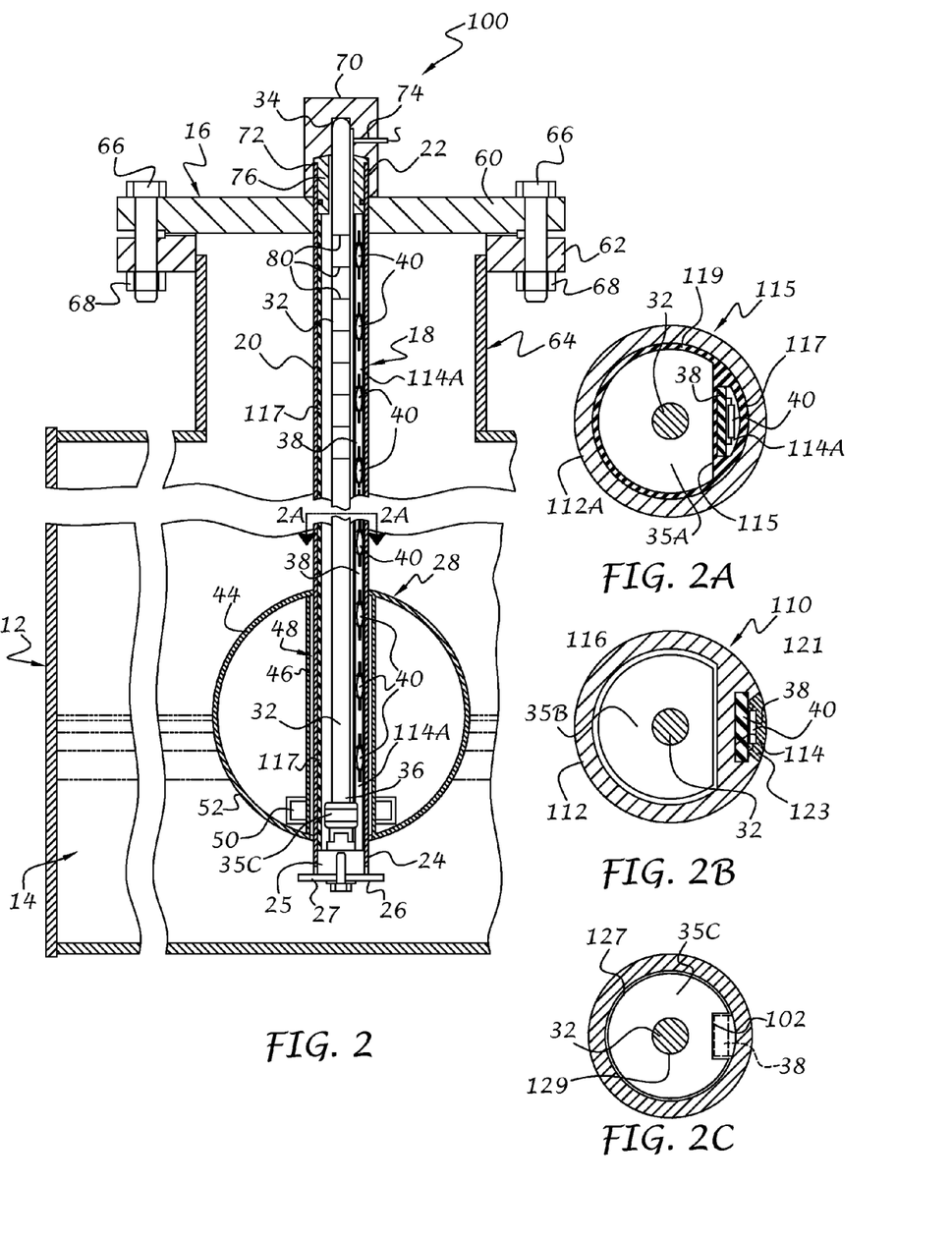
FIG. 2 is a view similar to FIG. 1 of a liquid level transducer in accordance with a further exemplary embodiment of the invention.
FIG. 2A is a sectional view of a portion of the magnetic coupler of FIG. 2A as viewed from line 2A-2A of FIG. 2.
FIG. 2B is a sectional view of a portion of a liquid level transducer in accordance with a further embodiment of the invention as viewed from line 2B-2B in FIG. 1 showing the sensor board at a different location than the FIG. 1 embodiment.
FIG. 2C is a top plan view of a portion of a magnetic coupler mounted in a sensor tube in accordance with a further embodiment of the invention.

In use, when the end cap 70 is installed on the cover 60 as shown in FIG. 1, the gauging rod 32 is in the rest position, where the rod may or may not be magnetically coupled to the float 28. In this position, the float is free to travel along the length of the sensor tube 20, but the gauging rod 32 is restrained from movement. In this manner, electronic determination of the liquid level within the tank can always be available. When it is desirous to take a manual measurement of the level of liquid in the tank 12, such as when emptying or filling the tank, the end cap 70 is removed and the gauging rod is pulled out of the tank until it is magnetically coupled with the float 28. The user can then visually observe level markings 80 (such as shown in FIG. 2) located along the length of the gauging rod to determine the liquid level within the tank 12. The gauging rod 32 can then be magnetically decoupled from the float and pushed back into the sensor tube 20 and the end cap replaced. With the sensor board 38 connected to the gauging rod 32 for movement therewith, a magnet (not shown) can be located at the top of the tank to trip one or more of the reed switches and thereby give a simultaneous liquid level signal.

Referring now to FIGS. 2 and 2C, a liquid level transducer 100 in accordance with a further exemplary embodiment of the present invention is illustrated. The transducer 100 is similar in construction to the transducer 10 previously described, with the exception that the sensor board 38 is fixedly mounted in the sensor tube 20, such that the gauging rod 32 can be moved when the cap 70 is removed, with the sensor board 38 remaining stationary. In this manner, potential damage to the sensor board 38, that may occur upon bumping when the gauging rod 32 is raised, is eliminated.

As shown in FIG. 2A, the magnet 35A is semi-cylindrical in shape with a flat side 115 formed therein to accommodate an insert 117 for holding the sensor board 38. The magnet 35A is connected to the lower end of the gauging rod 32. The insert 117 is preferably formed of a non-magnetic material through extrusion or other known forming methods and includes a circular body 119 that fits snugly within the sensor tube 20 and it complementary in shape to the magnet 35A so that the magnet can be slid freely along the extrusion during manual determination of the liquid level as described above. A channel 114A is formed in the insert 117 for receiving the sensor board 38 and its components, such as reed switches 40 and the like. As the gauging rod is pulled out of the tank or pushed into the tank, as described above, the channel 114A is isolated from the magnet 35A and provides protection around the sensor board 38 and its electronic components to prevent interference and possible damage that might otherwise occur during movement of the gauging rod 32.

Referring now to FIG. 2B, a portion 110 of a liquid level transducer in accordance with a further embodiment of the invention is illustrated. As shown, an outer sensor tube 112 is similar in construction to the outer sensor tube 20 previously described, with the exception that a longitudinal channel 114B is formed in the outer surface 121 of the wall 116 of the sensor tube 112 for receiving and capturing the sensor board 38 and its electronic components. Potting material 123 or other means for protecting the electronics, such as shrink wrap, coating the board 38 with a suitable hydrophobic and/or oleophobic layer, and so on, can be used for encapsulating and protecting the sensor board 38 and its associated electronic components from the contents of the tank 12. In this manner, the magnet 35B, which is similar in construction to the magnet 35A, is free to slide along the inside of the sensor tube 112 during manual determination of liquid level, etc.

Referring now to FIG. 2C, a top plan view of a magnet 35C installed in the sensor tube 20 (shown in cross-section) in accordance with a further embodiment of the invention is illustrated. The magnet 35C includes an annular body 127 with a central bore 129 formed therein for receiving the gauging rod 32. A channel 102 is formed in the body 127 and is sized for receiving the sensor board 38, which is mounted to the inside surface of the sensor tube 20 through adhesive bonding, mechanical fastening, and so on. The channel 102 has sufficient clearance to allow sliding movement of the gauging rod 32 within the sensor tube 20 without the need to modify the sensor tube to accommodate the sensor board 38 and its components.

It will be understood that the term "magnet" as used above in relation to magnets 35, 35A, 35B, and 35C, refers to the magnet itself and/or to the housing in which the magnet may be placed, as well as other components that may be associated with the coupling end of the gauging rod 32. Accordingly, the above-described embodiments and their associated channels can be dimensioned to accommodate other components associated with the magnet.

Figure 3:
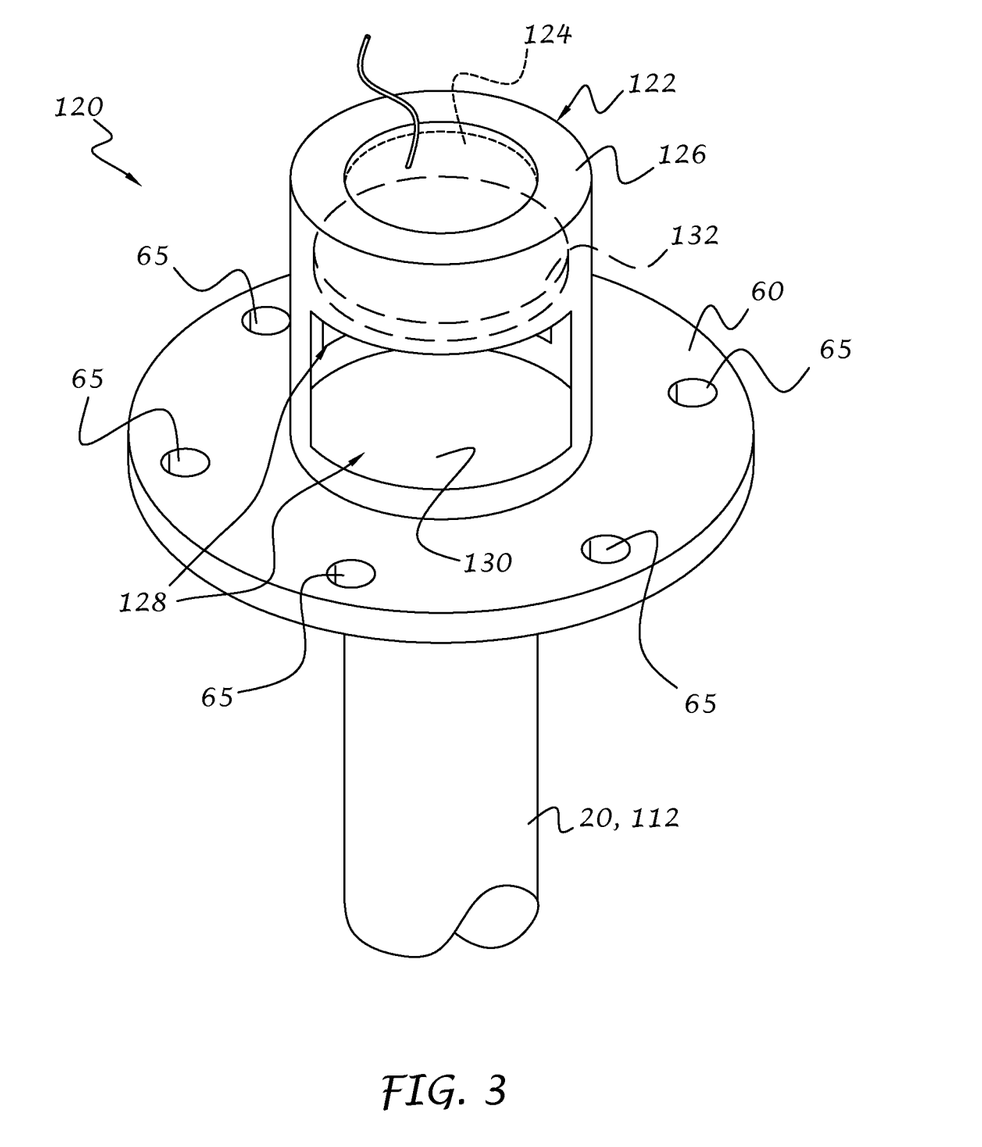
FIG. 3 is an isometric view of a gauge head in accordance with the invention for use with the embodiments of FIGS. 1 through 2C.

Referring now to FIG. 3, a mounting head assembly 120, for use with any of the previous exemplary embodiments, is illustrated. The mounting head assembly 120 preferably includes the manway cover 60, as previously described, with mounting holes 65 for receiving the bolts 66 (FIG. 1) as previously described. As shown, an end cap 122 is removably connected to the manway cover 60 and includes a generally cylindrical housing with an annular side wall 124 that extends upwardly from the cover 60 and an upper wall 126 that is integrally formed with the side wall. One or more windows 128 are formed in the side wall of sufficient size to permit ambient light to impinge upon a reflective surface 130. The light is in turn reflected upwardly to an array of solar cells 132 (shown in hidden line) positioned in the end cap 122 above the windows 128. In this manner, the relatively fragile solar cell array is protected from damage that may otherwise occur due to environmental factors. An electrical section 134, as represented by dashed line, is located in the upper wall 126 and may include electronic components such as a PCB, a microprocessor or the like for receiving signals from the sensor board 38, a radio frequency (RF) transmitter or transceiver for wirelessly communicating liquid level measurements at a remote location, as well as other components to interface between the solar array and the PCB, reduce electronic noise, and so on. The electrical section 134 can be encapsulated in potting material or may be coated with any well-known electronic coating materials, and so on, to protect the electrical section 134 from the environment. Other electrical components for signaling a liquid level condition can also be provided in the electrical section 134, such as one or more light emitting members including LED's, lamps, strobe lights, and so on, as well as piezoelectric sound generators, speakers, and so on, for automatically visually and/or audibly alerting the user when the level has reached a particular level, such as a near full condition when the tank is being filled.

Although a reed switch-type sensor board 38 has been shown and described, it will be understood that the present invention is not limited thereto. Other non-linear and linear-type liquid level measurement sensors can be used, including but not limited to other magnetic sensing probe technologies such as solid state magnetic flux field sensors (hall effect or MR or GMR) magnetostrictive probe devices, solid state Micro-Electro-Mechanical Systems, or MEMS, magnetic switches, as well as nonmagnetic sensing technologies such as capacitance, heated wire, ultrasonic, optical, resistance cards or tracks coupled with conductive cards or tracks through a magnetic electrically conductive coupling medium, and so on. By way of example, a suitable magnetically coupled resistance track for determining liquid level is found in U.S. Published Application No. US2006/0016256 to Bauerle et al. published on Jan. 26, 2006, the disclosure of which is hereby incorporated by reference. Accordingly, it will be understood that the type of sensor(s) used can greatly vary while accomplishing the purposes of the present invention.

Figure 4:
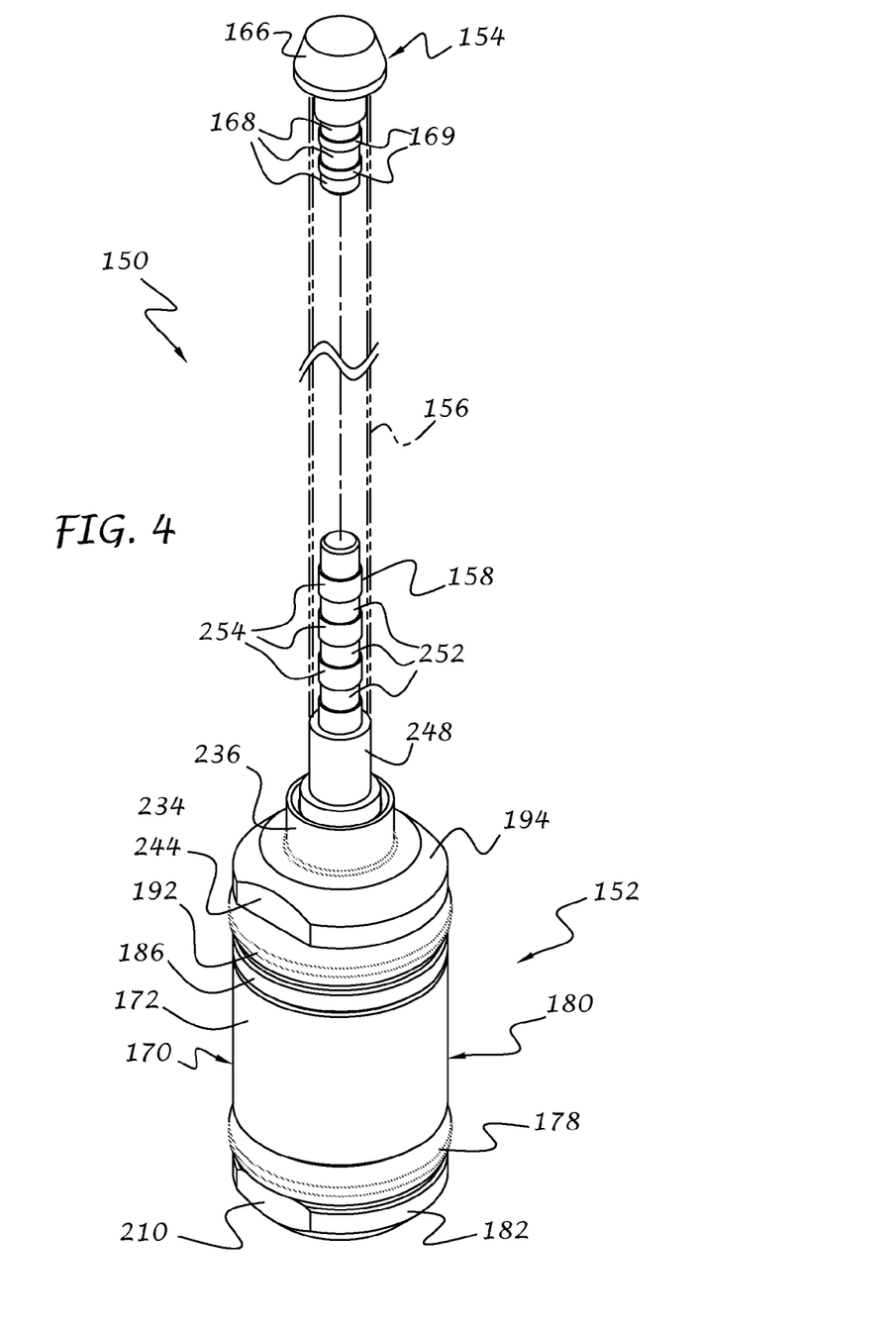
FIG. 4 is an isometric view of a gauging rod assembly with magnetic coupler in accordance with an exemplary embodiment of the invention.
Figure 5:
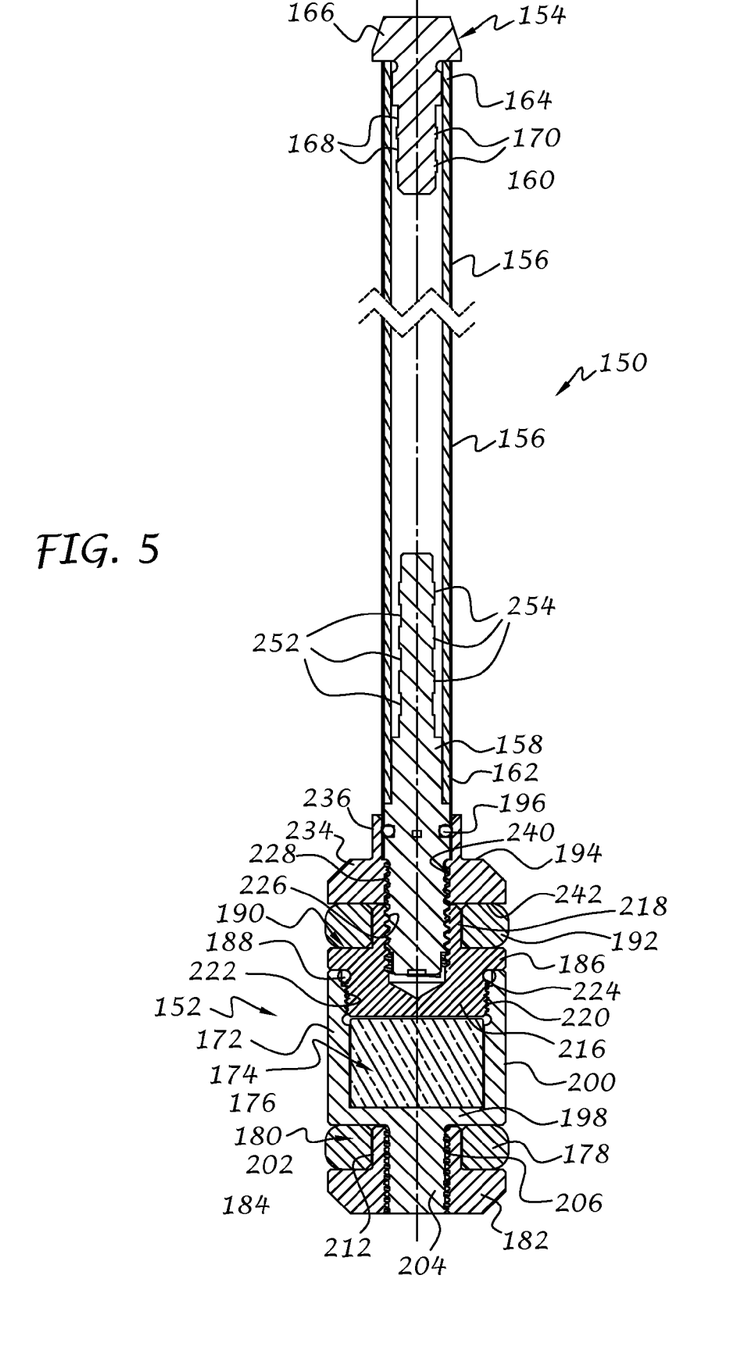
FIG. 5 is a longitudinal sectional view thereof.

Referring now to FIGS. 4 and 5, a gauging rod assembly 150 in accordance with an exemplary embodiment of the invention is illustrated. The gauging rod assembly 150 is intended to fit within the sensor tube 20 (FIG. 2) and slide therealong during liquid level determination, such as when a user pulls on the gauging rod until it magnetically couples with the float 28 (FIG. 2) or pushes on the gauging rod until it decouples from the float and returns to its rest position. To that end, the gauging rod assembly 150 preferably includes a lower magnetic coupling assembly 152 connected to an upper rod end cap 154 via an elongate tube or hollow rod 156. The rod 156 is shown in phantom line in FIG. 4 so that the details of the coupling assembly 152 and end cap 154 can be seen.

The rod 156 is preferably of sufficient diameter or cross-dimension to receive the first sensor board 38 and its associated sensor(s) and other electronics as previously described with respect to the FIG. 1 embodiment. The rod 156 is preferably constructed of non-magnetic material. Suitable materials include, but are not limited to, as plastic, aluminum, composites such as carbon fiber, fiberglass, and so on, as well as other materials or combinations thereof. A lower end 162 of the rod 156 is preferably press-fit onto a lower rod mount 158 of the coupling assembly 152. Likewise, an upper end 164 of the rod 156 is preferably press-fit onto an upper rod mount 160 of the upper end cap 154. The rod 156 can also or alternatively be connected to the mounting sections through adhesive bonding, welding, interference fitting, mechanical clamping, or other well-known connecting means.

The upper end cap 154 is preferably constructed of a non-magnetic material, such as aluminum or any suitable material as mentioned above, and includes an upper cap section 166 with the upper rod mount 160 extending downwardly therefrom. The cap section 166 and mounting section 160 are preferably integrally formed, but may be formed separately and connected together through well-known connection means without departing from the spirit and scope of the invention. As shown, the cap section 166 is frustoconical in shape to reduce potential galling, welding or seizing that may occur over time as the gauging rod assembly 150. This may occur when the gauging rod 150 is immersed in antifreeze solution or the like that may be located in the sensor tube 20, as is common practice. Special coatings can also be applied to the surfaces of one or more of the components of the gauging rod assembly 150. It will be understood that the cap section 166 is not limited to the shape as shown and described, but may be constructed of a variety of different shapes without departing from the spirit and scope of the invention.

The upper rod mount 160 has alternating annular grooves 168 and ridges 169 that facilitate insertion of the upper rod mount 160 into the rod 156 while impeding removal of the rod from the upper rod mount. The upper rod mount 160 can be coated with adhesive or other bonding materials, with the adhesive filling one or more of the grooves when bonding the upper end cap 154 to the rod 156. It has been found that, with such an arrangement, the rod 156 will break before being removed from the upper end cap 166. Pull tests to verify these results included forming the upper end cap out of aluminum and the rod 156 out of carbon fiber. It will be understood that the particular materials are given by way of example only since, as stated above, a wide variety of suitable materials can be used.

Figure 6:
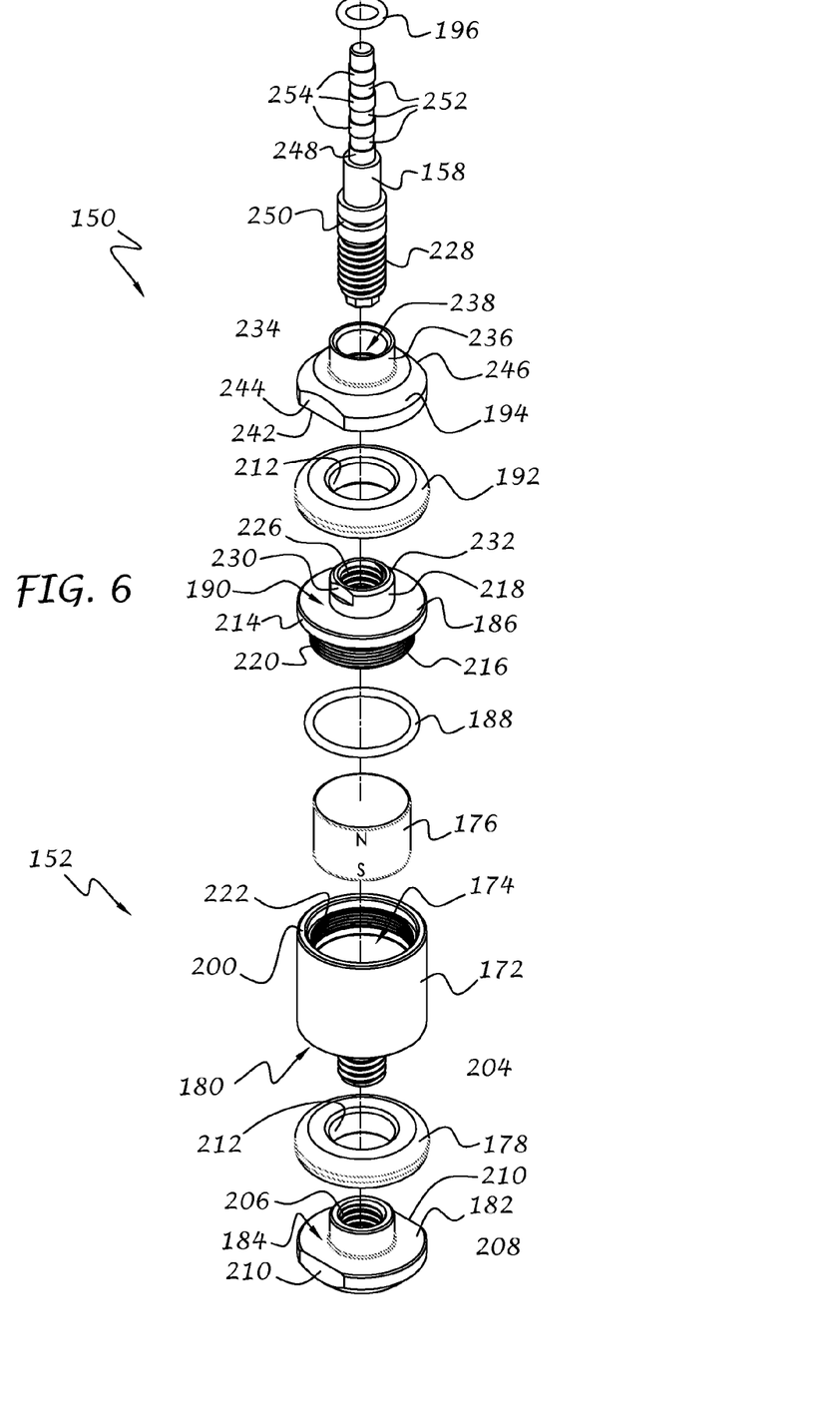
FIG. 6 is an exploded isometric view of the magnetic coupler portion of the gauging rod assembly of FIG. 4.

Referring now to FIGS. 5 and 6, the magnetic coupling assembly 152 preferably includes a magnetic coupling section 170 and the lower rod mount 158 extending upwardly from the coupling section 170. The magnetic coupling assembly, as stated above, is intended to magnetically couple with the annular magnet 50 located in the float 28 (FIG. 1A) so that the level of the fluid in the tank can be manually and/or electronically ascertained, as previously described.

The magnetic coupling section 170 preferably includes a housing 172 with a hollow interior 174 for receiving a magnet 176 therein. A first bushing 178 is connected to a first lower bushing seat 180 formed in the housing. A lower bushing lock member 182 is connected to the housing and has a second lower bushing seat 184 for sandwiching the first bushing 178 therebetween. A housing cover 186 is connected to the housing for securing the magnet therein. A first O-ring 188 is positioned between the housing 172 and the housing cover 186 to hermetically seal the interior 174 of the housing 172 against the outside environment, including the afore-mentioned antifreeze or other fluids or contaminants that, in the prior art, would infiltrate the magnet space and destroy the magnet material. An upper bushing seat 190 is formed in the housing cover 186 and a second bushing 192 is positioned on the bushing seat 190 and held thereon via an upper bushing retainer 194 to sandwich the upper bushing 192 between the housing cover 186 and the retainer 194. The lower rod mount 158 is connected to the upper bushing retainer 194, and a second O-ring 196 is located between the upper bushing retainer 194 and the lower rod mount 158 (FIG. 5) to seal the inner geometry of the components against the ingress of antifreeze or other corrosive contaminants that may be located within the sensor tube 20 (FIG. 1). In this manner, the sensor board 38 (FIG. 1A) and its associated sensor(s) are also hermetically sealed from the contents of the sensor tube 20.

The housing 172 is generally cylindrical in shape and includes a bottom wall 198 and a continuous side wall 200 extending upwardly therefrom to form the hollow interior 174. A lower surface 202 of the bottom wall 198 forms the first lower bushing seat 180. An externally threaded stud 204 extends downwardly from the bottom wall 198 and engages an internally threaded boss 206 extending upwardly from a base 208 of the lower bushing locking member 182. The locking member 182 includes a pair of opposing flats 210 for engagement with a wrench or the like during assembly and disassembly of the magnetic coupling section 170.

The first bushing 178 is preferably circular in shape and includes a central opening 212 that snugly fits around the outer surface of the threaded boss 206. An outer diameter of the bushing 178 is preferably sized to slide along the inner surface of the sensor tube 20 and guide the magnetic coupling assembly in a linear direction when being pulled outwardly of the tank and into magnetic coupling engagement with the float or pushed out of magnetic engagement with the float to the rest position, as previously described, so that the bushing functions as a linear bearing, thereby minimizing friction and hysteresis over prior art solutions. In order to reduce frictional contact with the sensor tube 20, the bushing 178 is preferably formed of nylon, brass, or other materials with low friction and/or self-lubricating properties. Although the bushing 178 is shown as generally annular in shape, it will be understood that other bearing shapes, as well as other types of linear bearings can be used without departing from the spirit and scope of the invention.

The magnet 176 is preferably cylindrically-shaped or disk-shaped, and is sized to fit snugly within the interior 174 of the housing 172. Although many known materials can be used for the magnet, a preferred material is ceramic or ferrite and can be made of a sintered composite of powdered iron oxide and barium/strontium carbonate ceramic. Other suitable magnet materials can include, but are not limited to, Neodymium or other rare earth magnets, Alnico or other cast or sintered magnetic materials, or other well-known materials with a permanent magnetism. A preferred size of the magnet 176 is approximately 0.75 inch OD by 0.5 inch high, which gives an approximate pull (or holding) force that is four times greater than the prior art when within the magnetic field of the prior art when combined with the ring magnet 50 installed in the float 28. It will be understood that the magnetic material and dimensions are given by way of example only and can greatly vary without departing from the spirit and scope of the invention.

The housing cover 186 includes a disk-shaped bottom wall 214 with a lower circular wall 216 extending downwardly therefrom and an upper annular wall 218 extending upwardly therefrom. The lower circular wall 216 has external threads 220 for engaging internal threads 222 formed in the continuous side wall 200 of the housing 172. As best shown in FIG. 5, a shoulder 224 is formed on the inner surface of the side wall 200 for receiving the O-ring 188. When assembled, the O-ring 188 is sandwiched between the shoulder 224 and the bottom of the lower circular wall 216 of the housing cover 186 to thereby seal the interior 174 of the housing 172, and thus the magnet 176, against coolant or other corrosive liquids or contaminants that may be located outside of the housing 172. The upper annular wall 218 has internal threads 226 for engaging the external threads 228 of the lower rod mount 158 to thereby connect the lower rod mount 158 to the magnetic coupling section 152. The disk-shaped bottom wall 214 forms the upper bushing seat 190 for receiving the second or upper bushing 192, which is similar in construction to the first or lower bushing 178. The central opening 212 of the second bushing 192 is sized to snugly receive the upper annular wall 218 therein. As with the lower bushing 178, the upper bushing also has an outer diameter that is preferably sized to slide along the inner surface of the sensor tube 20 and guide the magnetic coupling assembly in a linear direction when being pulled outwardly of the tank and into magnetic coupling engagement with the float or pushed out of magnetic engagement with the float to the rest position, as previously described, so that the second bushing functions as a linear bearing, thereby minimizing friction and hysteresis over prior art solutions. In order to reduce frictional contact with the sensor tube 20, the bushing 192 is preferably formed of nylon, brass, or other materials with low friction and/or self-lubricating properties. Although the bushing 192 is shown as generally annular in shape, it will be understood that other bearing shapes, as well as other types of linear bearings can be used without departing from the spirit and scope of the invention. With the provision lower and upper bushings, the magnetic coupling assembly can only move in a linear direction along the sensor tube 20, thereby reducing or eliminating hysteresis and its attendant problems and inaccuracies when attempting to manually determine the liquid level of the tank by the afore-mentioned magnetic coupling of the magnetic coupling assembly and the float.

As with the lower locking member 182, the housing cover 186 also has opposing flats 230, 232 for securing the housing cover to the housing 172 with a wrench or the like. However, it will be understood that other means for securing the housing cover to the housing can be used without departing from the spirit and scope of the invention.

The upper locking member 194 is similar in shape to the lower locking member 182 and includes a generally disk-shaped base 234 with an annular wall 236 extending upwardly therefrom and a central bore 238 with internal threads 240 (FIG. 5) coincident with the base 234 for engaging the external threads 228 of the lower rod mount 158 to thereby connect the lower rod mount 158 with the upper locking member 194 and the housing cover 186 in a double-nut-type arrangement. In this manner, the lower rod mount 158 is positively locked to the upper locking member 194 and the housing cover, and thus to the magnetic coupling assembly 152. The lower surface 242 of the base 234 forms an upper bushing seat such that the upper bushing 192 is sandwiched between the housing cover 186 and the upper locking member 194. As with the lower locking member 182 and the housing cover 186, the upper locking member 194 also has opposing flats 244, 246 (FIG. 6) for securing the upper locking member 194 to the housing cover 186 and lower rod mount 158 with a wrench or the like. However, it will be understood that other means for securing can be used without departing from the spirit and scope of the invention.

The lower rod mount 158 is somewhat similar in construction to the upper rod mount 154 previously described, and is preferably constructed of a non-magnetic material, such as aluminum or any suitable material as mentioned above. The lower rod mount 158 includes a body 248 with the outer threads 228 formed at a lower end portion thereof. An annular groove 250 is formed in the body 248 above the threads 228 for receiving the O-ring 196 which, when assembled, is pressed against the inner surface of the bore 238 of the upper locking member 194 to thereby seal the lower rod mount 58 to the upper locking member 194. An upper portion of the lower rod mount 158 above the O-ring groove 250 includes alternating annular grooves 252 and ridges 254 that facilitate insertion of the lower rod mount 158 into the rod 156 (FIGS. 4 and 5) while impeding removal of the rod from the lower rod mount. As with the upper rod mount, the lower rod mount 158 can be coated with adhesive or other bonding materials, with the adhesive filling one or more of the grooves when bonding the lower rod mount 158 to the rod 156. It will be understood that the particular materials are given by way of example only since, as stated above, a wide variety of suitable materials can be used.

It will be understood that the term "preferably" as used throughout the specification refers to one or more exemplary embodiments of the invention and therefore is not to be interpreted in any limiting sense. It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. By way of example, the mounting head is not limited to the flange-type arrangement as shown and described but can be formed with threads or other known mounting means for connecting the transducer to the container without departing from the spirit and scope of the invention. In addition, the sensor elements can be in the form of hall-effect sensors, optical sensors, or the like where direct contact is not required to change an electrical state of the sensor elements. Likewise, the actuator can be in the form of one or more magnets, LED's, optical fibers or other light source, or other contactless actuator/sensor arrangements to remotely change the electrical state of the sensor elements. In the event that optical sensors are used, the housing can be formed of a material that is translucent or transparent to the wavelength of the light source so that the sensor elements can readily detect movement of the light source as the liquid level in the container rises and falls. It will be understood, therefore, that this invention is not limited to the particular embodiments disclosed, but is intended to cover modifications within the spirit and scope of the present invention as defined by the appended claims.

What is claimed is:

1. A transducer for determining the level of liquid within a container, the transducer comprising:
   a mounting head adapted for connection to the container; and
   a sensor assembly adapted to extend into the container from the mounting head, the sensor assembly comprising:
   a sensor tube extending downwardly from the mounting head;
   a gauging rod assembly having an elongate rod positioned in the sensor tube for selective movement out of the tank for visually determining the liquid level;
   a first magnet connected to the gauging rod assembly;
   a float surrounding the sensor tube for sliding therealong in response to a change in liquid level;
   a second magnet connected to the float for selective coupling to the first magnet so that the gauging rod assembly and the float are selectively coupled together; and
   a first sensor board extending along a length of one of the sensor tube and the gauging rod assembly and being responsive to movement of the float for electronically determining the liquid level without the need to magnetically couple the gauging rod assembly to the float.

2. A transducer according to claim 1, wherein the elongate rod is hollow, and the sensor board is located inside of the elongate rod and includes at least one sensor responsive to movement of the float for electronically determining the level of liquid within the container.

3. A transducer according to claim 2, wherein the at least one sensor comprises one of a hall-effect sensor and a reed switch responsive to the proximity of the second magnet connected to the float.

4. A transducer according to claim 3, wherein the at least one sensor comprises a plurality of reed switches positioned along a length of the sensor board such that movement of the second magnet along the sensor tube in response to a change in liquid level causes one or more of the reed switches to change an electrical state to thereby determine the level of liquid in the container.

5. A transducer according to claim 1, and further comprising an elongate body located in the sensor tube and a channel formed in the body, wherein the sensor board is located outside of the elongate rod and within the channel, the sensor board including at least one sensor responsive to movement of the float for electronically determining the level of liquid within the container.

6. A transducer according to claim 5, wherein the at least one sensor comprises one of a hall-effect sensor and a reed switch responsive to the proximity of the second magnet connected to the float.

7. A transducer according to claim 6, wherein the at least one sensor comprises a plurality of reed switches positioned along a length of the sensor board such that movement of the second magnet along the sensor tube in response to a change in liquid level causes one or more of the reed switches to change an electrical state to thereby determine the level of liquid in the container.

8. A transducer according to claim 1, wherein the gauging rod assembly comprises:
   a magnetic coupling section connected to a lower end of the elongate rod, the magnetic coupling section containing the first magnet; and
   a cap section connected to an upper end of the elongate rod.

9. A transducer according to claim 8, wherein the magnetic coupling section comprises:
   a housing having a hollow interior for receiving the first magnet;
   a housing cover for enclosing the first magnet;
   a first bushing located on one side of the housing and being sized to fit within the sensor tube and guide the gauging rod assembly linearly along a length of the sensor tube.

10. A transducer according to claim 9, and further comprising a second bushing located on a side of the housing opposite the first bushing, the second bushing being coaxial with the first bushing and the sensor tube and being sized to fit within the sensor tube and guide the gauging rod assembly linearly along a length of the sensor tube.

11. A transducer according to claim 10, and further comprising a seal positioned between the housing and the housing cover to thereby seal the hollow interior and the first magnet against outside contaminants.

12. A transducer according to claim 11, wherein the magnetic coupling section further comprises:
 a lower bushing retainer connected to the housing with the first bushing sandwiched therebetween; and
 an upper bushing retainer connected to the housing cover with the second bushing sandwiched therebetween.

13. A transducer according to claim 12, wherein the magnetic coupling section further comprises a lower rod mount connected to the upper bushing retainer and extending upwardly therefrom for connecting the magnetic coupling section to the elongate rod.

14. A transducer according to claim 13, wherein the lower rod mount comprises alternating grooves and ridges for connection to the elongate rod.

15. A transducer according to claim 1, wherein the mounting head comprises:
 a mounting head housing having an upper wall and a side wall extending downwardly therefrom to form a mounting head housing interior;
 a second sensor board positioned on the upper wall and operatively associated with the first sensor board for receiving and processing a liquid level signal therefrom;
 at least one opening is formed in the side wall for receiving ambient light into the mounting head housing interior;
 a reflector is positioned at a lower end of the side wall for reflecting ambient light toward a bottom of the top wall; and
 a solar panel connected to the bottom of the top wall for receiving the reflected ambient light, the solar panel being operably connected to at least the signal processing board to thereby provide electrical power thereto.

16. A liquid level gauge for determining the level of liquid within a container, comprising:
 a mounting head adapted for connection to the container;
 a guide tube extending downwardly from the mounting head;
 a gauging rod assembly having an elongate rod with level markings thereon, the elongate rod being normally positioned in the guide tube for selective movement out of the tank for visually determining the liquid level;
 a first magnet connected to the gauging rod assembly;
 a float surrounding the guide tube for sliding therealong in response to a change in liquid level;
 a second magnet connected to the float for selective coupling to the first magnet so that the gauging rod assembly and the float are selectively coupled together at a height of the liquid level;
 a magnetic coupling section comprising:
  a housing having a hollow interior for receiving the first magnet;
  a housing cover for enclosing the first magnet; and
  a first bushing located on one side of the housing and being sized to fit within the guide tube to thereby guide the gauging rod assembly linearly along a length of the guide tube.

17. A liquid level gauge according to claim 16, and further comprising a second bushing located on a side of the housing opposite the first bushing, the second bushing being coaxial with the first bushing and the guide tube and being sized to fit within the guide tube for guiding the gauging rod assembly linearly along a length of the guide tube.

18. A transducer according to claim 17, and further comprising a seal positioned between the housing and the housing cover to thereby seal the hollow interior and the first magnet against outside contaminants.

19. A transducer according to claim 17, wherein the magnetic coupling section further comprises:
 a lower bushing retainer connected to the housing with the first bushing sandwiched therebetween; and
 an upper bushing retainer connected to the housing cover with the second bushing sandwiched therebetween.

20. A transducer according to claim 19, wherein the magnetic coupling section further comprises a lower rod mount connected to the upper bushing retainer and extending upwardly therefrom for connecting the magnetic coupling section to the elongate rod.

* * * * *